United States Patent
Hawkins et al.

(10) Patent No.: US 10,968,889 B2
(45) Date of Patent: Apr. 6, 2021

(54) WIND TURBINE CONTROL

(71) Applicant: Siemens Gamesa Renewable Energy A/S, Brande (DK)

(72) Inventors: Samuel H. Hawkins, Vejle (DK); Michael Bilet Skovgaard Steffensen, Hasselager (DK)

(73) Assignee: SIEMENS GAMESA RENEWABLE ENERGY A/S

( * ) Notice: Subject to any disclaimer, the term of this patent is extended or adjusted under 35 U.S.C. 154(b) by 0 days.

(21) Appl. No.: 16/775,404

(22) Filed: Jan. 29, 2020

(65) Prior Publication Data

US 2020/0248674 A1    Aug. 6, 2020

(30) Foreign Application Priority Data

Feb. 4, 2019    (EP) .................................... 19155336

(51) Int. Cl.
*F03D 7/02*    (2006.01)
*F03D 80/60*   (2016.01)
*F03D 7/04*    (2006.01)

(52) U.S. Cl.
CPC .......... *F03D 7/0276* (2013.01); *F03D 7/044* (2013.01); *F03D 80/60* (2016.05)

(58) Field of Classification Search
CPC ......... F03D 7/0276; F03D 80/60; F03D 7/044
See application file for complete search history.

(56) References Cited

U.S. PATENT DOCUMENTS

2015/0159625 A1    6/2015  Hardwicke, Jr. et al.
2015/0322926 A1*  11/2015  Caponetti ............... F03D 7/028
                                                              416/1
2016/0076515 A1    3/2016  Petersen et al.

FOREIGN PATENT DOCUMENTS

EP        2309122 A1    4/2011
WO    2012149984 A1   11/2012

OTHER PUBLICATIONS

European Search Report dated Aug. 16, 2019 for Application No. 19 155 336.1.

* cited by examiner

*Primary Examiner* — Viet P Nguyen
(74) *Attorney, Agent, or Firm* — Schmeiser, Olsen & Watts LLP (57) ABSTRACT

A method of controlling the operation of a wind turbine is provided. The wind turbine includes a rotor, a generator and at least one heat generating component. The method includes obtaining a temperature of the heat generating component; determining the presence of a predetermined increase of the temperature of the heat generating component; and upon determining the presence of the predetermined temperature increase, controlling the rotational speed of the generator so as to increase the rotational speed of the generator while not increasing the electrical power output of the generator or while increasing the electrical power output of the generator at a smaller proportion than the increase in rotational speed of the generator so as to reduce the level of electrical current in the generator.

13 Claims, 6 Drawing Sheets

WIND TURBINE CONTROL

CROSS-REFERENCE TO RELATED APPLICATIONS

This application claims priority to European Application No. 19155336.1, having a filing date of Feb. 4, 2019, the entire contents of which are hereby incorporated by reference.

FIELD OF TECHNOLOGY

The following relates to a method of controlling the operation of a wind turbine comprising a rotor, a generator and at least one heat generating component. The following further relates to a respective wind turbine control unit, a wind turbine, and a computer program for controlling the wind turbine. The following in particular relates to a method and a control unit for limiting an increase of the temperature of the heat generating component.

BACKGROUND

Wind turbines can include a number of components that produce heat due to electrical losses during the delivery of electrical energy, for example a generator of the wind turbine that converts mechanical energy provided by a rotor of the wind turbine to electrical energy, or a converter that converts the electrical energy such that it is suitable for being fed into a power grid. A wind turbine may comprise further components, such as a transformer connected between the converter and the power grid, which also produce heat and may require cooling. The generator, converter and transformer form part of the wind turbine's electrical drivetrain. Heat can furthermore be generated in other components of the electrical drivetrain, such as in further power conditioners, power cabling, bus bars and the like.

At higher ambient temperatures, the cooling of the wind turbine components becomes more difficult. Such conditions can lead to an overheating of the components of the electrical drivetrain. A conventional wind turbine can comprise a protection system that prevents damage to such components from overheating. A conventional protection system shuts down the operation of the wind turbine to stop heat production and protect the components from damage. Such solution suffers from the drawback that the energy production is stopped, so that less electrical energy is delivered to consumers, resulting in respective revenue losses for the operators of the wind turbine.

To avoid these negative effects, the document EP 2 309 122 A1 proposes a method for controlling a wind turbine at high thermal loads, in which the output power of the wind turbine is controlled on the basis of a comparison of a temperature of such component with a temperature set point. The method allows an adaptation of the power production to the component temperature, and by reducing the output power, heating due to electrical losses is reduced, and the actual temperature of the component can be kept below the set point temperature for the respective component. The output power is reduced by adjusting a pitching angle of the rotor blades of the wind turbine rotor so that less wind energy is transferred to the rotor blades and converted into mechanical energy, whereby the amount of power produced by the wind turbine is reduced. Generally, when the power output of the wind turbine is reduced, the rotor speed is also reduced so that long-term fatigue loading is reduced (e.g. cyclic gravity loading on the blades or wear on the gears and bearings) and lead edge erosion of the blades is avoided.

It is desirable to protect such wind turbine components from overheating without reducing the amount of power that is produced by the wind turbine. In particular, it is desirable to maintain the amount of power that is produced by the wind turbine while ensuring that the components of the wind turbine operate within safe temperature limits. Also, in situations in which ambient temperatures rise or failures occur in the cooling system, it is desirable to avoid that the power delivery to consumers is curtailed.

SUMMARY

An aspect relates to maintaining power output or provide less reduction of the power output of the wind turbine while limiting the temperature increase of wind turbine components.

According to an embodiment of the invention, a method of controlling the operation of a wind turbine comprising a rotor, a generator and at least one heat generating component is provided. The method comprises obtaining a temperature of the heat generating component and determining the presence of a predetermined increase of the temperature of the heat generating component. Upon determining the presence of the predetermined temperature increase, the rotational speed of the generator is controlled so as to increase the rotational speed of the generator while not increasing the power output of the generator. The rotational speed of the generator can in particular be controlled so as to reduce the generator torque and thereby reduce the level of electrical current in the generator. The generator speed may also be increased while increasing the electrical power output of the generator at a smaller proportion than the increase in rotational speed of the generator so as to reduce the level of electrical current in the generator. Increasing the generator output at such smaller proportion may also reduce the generator torque.

In other words, the power offtake from the generator (or the electrical load on the generator) is kept constant or is reduced, while the rotational speed of the generator is increased. The torque applied to the generator can thus be limited, which results in lower current levels in the generator. The heat generating component may be a component which generates heat due to electrical losses associated with the production of electrical power by the wind turbine. As the amount of heat generated by wind turbine components, in particular components of the electrical drivetrain, is in general proportional to the square of the electrical current flowing in conductors of these components, the reduced current level in these components may limit the heat production by these components and thus a temperature increase of the temperature of these components. Furthermore, a reduced heat generation in the generator may allow a redirection of cooling capacity of a cooling system from the generator to another heat generating component, which may or may not directly benefit from the reduced current levels that are achieved with the present method. The present embodiment may thus provide a method of efficiently limiting the temperature increase of the heat generating component by increasing the rotational speed of the generator while not requiring a decrease in the power output of the generator.

The electrical power output of the generator may also be increased at a smaller proportion than the increase in rotational speed of the generator. A reduction of the generator torque and the associated currents may thus still be achieved, so that heat generation due to electrical losses may be reduced. The percentage increase of power output may be less than 90%, 70%, 50%, or 25% of the percentage increase of the rotational speed of the generator. For example, if the rotational speed of the generator is increased by 20%, the power output from the generator is increased by only 10%, i.e. the percentage increase of the power output is 50% less. An efficient torque reduction may thus be achieved.

The temperature may be obtained repeatedly, for example by repeatedly measuring or determining the temperature of the heat generating component, so as to determine the presence of the predetermined increase of the temperature of the heat generating component. The predetermined increase of the temperature may for example be an increase of the temperature of the component to a value that is equal to or above a respective temperature threshold, or an increase of the temperature at a rate that is above a respective rate threshold. The temperature may be obtained by reading a respective signal from a temperature sensor that is directly or indirectly associated with the respective heat generating component.

By reducing the current level in the generator, the heat generation may be reduced efficiently, while the output power of the wind turbine can remain stable. In particular, the generator of the wind turbine can be the component of the electrical drivetrain that is most affected by heat and thus is a limiting factor. Limiting the currents produced by the generator and thus the heat generation by the generator thus allow operation at higher ambient temperatures while maintaining the power output of the wind turbine.

In an embodiment, controlling the rotational speed of the generator comprises, or is performed by, controlling the rotational speed of the rotor of the wind turbine. For example, the rotor may directly drive the generator, or the rotor may be connected to the generator by means of a transmission (or gearbox) comprising a predetermined transmission ratio. Directly driving the generator means that the rotor of the wind turbine and the rotor of the generator rotate at the same angular velocity, they may for example be provided on the same shaft or on two shafts that are directly connected (a so called direct drive wind turbine). The rotational speed of the rotor may for example be controlled by controlling the pitch angle of blades of the rotor, either individually or collectively.

In an embodiment, the rotational speed of the generator is increased by increasing the rotational speed of the rotor by adjusting a pitch of rotor blades of the rotor. The rotational speed of the generator can thus be increased effectively while the power output of the generator can be maintained. Controlling the rotational speed of the generator in this way is particularly suitable for conditions where the rotational speed of the rotor is below a maximum allowable rotational speed of the rotor, and wind speeds are sufficient for the rated power production. In particular, the pitch of the rotor blades of the rotor may be adjusted so that the amount of wind energy that is transferred into mechanical energy by each rotor blade is increased. The pitch of the rotor blade may for example be adjusted by means of an actuator that rotates the rotor blade around its longitudinal axis.

In a further embodiment, controlling the rotational speed of the generator comprises controlling the power offtake from the generator. In other words, the power output of the generator can be reduced, e.g. the electrical load on the generator may be reduced. For example, the rotational speed of the generator may be increased by reducing the power offtake from the generator. As the load on the generator is reduced, the mechanical torque applied to the generator by the wind turbine rotor will increase the rotational speed of the generator. The resulting reduced current levels in the generator may again provide an effective means to control the temperature increase of the heat generating component. Such type of control is particularly useful in situations where the rotor speed cannot further be increased by adjusting the pitch of the rotor blades, for example in situations where the wind speeds are below the wind speeds required for producing the rated power, i.e. in situations in which the rotor blades are already pitched at a position for maximum aerodynamic efficiency. As the power offtake is decreased while the rotor speed is increased at the same time, the overall reduction in torque on the generator is higher than for a control in which the rotor speed is kept constant or reduced. Heat production can thus be limited more efficiently, and the wind turbine can be operated with a higher output power while temperature limits are not exceeded. The power offtake may for example be reduced by controlling a converter connected to the output of the generator. In a full converter solution, a generator side control or a grid side control of the converter may be performed.

Increasing the rotational speed of the generator may for example comprise reducing the power offtake from the generator. The pitch of rotor blades of the rotor may be maintained or may be adjusted so as to increase the aerodynamic efficiency of the blades while the power offtake from the generator is reduced. The pitch of the rotor blades may in particular be maintained at or be adjusted to a position with a maximum aerodynamic efficiency. In such configuration, the power output of the wind turbine can thus be maintained at the maximum possible level, while heat production is reduced, in particular for wind speeds below the wind speeds required for rated power production.

In an embodiment, if the presence of the predetermined temperature increase is detected, the rotational speed of the rotor is controlled by setting the rotational speed of the rotor to a maximum allowable rotational speed. In another embodiment, the rotational speed of the rotor may be gradually increased, for example up to the maximum allowable rotational speed. As mentioned above, the rotor speed may be increased by adjusting a pitch of the rotor blades, or by reducing the power offtake from the generator. The rotor speed can for example be adjusted to the allowable maximum upon detection that the component temperature, or rate of temperature increase, reaches or exceeds a respective threshold (step change). Such simple type of control has the advantage that it is relatively easy to implement. A more sophisticated control which only gradually increases the speed of the rotor may lead to reduced mechanical stress on the wind turbine components.

The maximum allowable speed of the rotor may be defined for the respective prevailing conditions. For example, for the wind turbine, a rotor speed envelope may be defined which establishes a maximum rotor speed permissible for combinations of wind speed and power output levels. The maximum rotor speed may generally be restricted by the structure and mechanical loading constrains of the wind turbine.

In an embodiment, the rotational speed of the rotor is controlled by a feedback loop based on the temperature and/or rate of temperature increase of the heat generating component. The feedback loop may for example employ a proportional integral (PI) control loop. The rotational speed of the rotor and/or the power offtake from the generator may thus be controlled, for example using a PI-controller. An error signal for such type of control may for example be determined by subtracting a temperature threshold from the determined temperature of the heat generating component, or vice versa. The feedback loop may then adjust the rotational speed of the rotor and/or the power offtake from the generator to minimize the error. The temperature of the heat generating component may thus be effectively controlled and limited by controlling the rotational speed of the generator.

In an embodiment, determining the presence of a predetermined increase of the temperature of the heat generating component comprises comparing the temperature of the heat generating component to a temperature threshold and determining that the temperature is equal to or larger than the temperature threshold. Additionally, or alternatively, determining the presence of the predetermined increase of temperature of the heat generating component may comprise comparing a rate at which the temperature of the heat generating component increases to an increase rate threshold and determining that the rate of temperature increase is equal to or larger than the increase rate threshold. Such thresholds provide effective means for determining when the temperature of the heat generating component increases to levels that are not acceptable or is about to increase to such levels.

In an exemplary embodiment, the rotational speed of the generator is controlled so as to minimize the amount of time that the temperature of the heat generating component is above a temperature threshold, for example by controlling the rotor speed and/or the power offtake from the generator. By ensuring that the time of operation above the temperature threshold is minimized, the lifetime of the heat generating component may be increased.

In an embodiment, if the rotor rotates at a maximum allowable rotational speed or reaches the maximum allowable rotational speed (which may again be determined by the rotor speed envelope), and the temperature of the heat generating component or a rate of temperature increase of the heat generating component reaches or exceeds a respective predetermined threshold, the method further comprises reducing the power offtake from the generator. For example, if the maximum rotational speed is reached and the temperature of the component is still above the threshold, the power output from the generator can be reduced to ensure that the temperature drops again below the threshold. The rotor can be controlled to continue operation at the maximum allowable rotational speed, for example by maintaining or adjusting the pitch of the rotor blades. By maintaining the maximum rotational speed of the rotor when reducing the power offtake from the generator, the amount of energy produced by the wind turbine remains relatively high compared to solutions in which the rotor speed is reduced to reduce heat generation.

It is certainly also conceivable to apply two temperature thresholds, wherein, when the temperature of the component reaches the first threshold, the rotors speed is increased up to the maximum allowable rotational speed, and upon the temperature reaching a second higher threshold, the power offtake from the generator is reduced.

In an embodiment, if the temperature or the rate of temperature increase are reduced to below the respective threshold or to below a separate different threshold, the rotational speed of the generator is returned to the nominal rotational speed specified for the respective operating conditions.

In an embodiment, not increasing the power output from the generator comprises controlling an electrical converter coupled to the generator such that the power offtake from the generator is not increased, i.e. is maintained or is reduced.

For example, the converter may be a PWM (Pulse Width Modulation) converter, and the switching ratio of the PWM converter may be adjusted to control the power offtake from the generator. Both, generator side control (e.g. control of the rectifier) or grid side control (e.g. control of the inverter) of the converter are conceivable. The controller may for example vary the switching ratio of the PWM inverter with the desired output power as a control target. In other embodiments, a field current of the generator may be adjusted to control the power output of the generator.

In a similar fashion, the power output from the generator may be controlled to increase at a smaller proportion than the increase in rotational speed of the generator. For example, the converter or the generator may be controlled so that the power output does not increase proportional to the increase in generator speed but increases less so that a torque reduction is achieved.

The generator and/or the electrical system may have a voltage limit. When increasing the rotational speed of the generator and such voltage limit is reached, the voltage may be maintained at the same level and the power factor may be adjusted to become closer to one (lagging). By maintaining power and voltage constant and increasing the power factor, generator currents can be reduced. The converter may for example be configured to be capable of adjusting the balance of active and reactive current in the generator. Additionally, or alternatively, the switching of capacitor banks into the electrical drivetrain may be controlled in order to supply reactive power into the network.

In an embodiment, the heat generating component is the generator, a component which generates heat due to electrical losses associated with the production of electrical power (for example a component the heat generation in which is related to a current produced by the generator), or a component cooled by cooling system that provides cooling to the generator. One, two or more of such heat generating components may be provided. The heat generating component may thus directly benefit from the reduced generator currents (as it will generate less heat due to the lower currents), or may indirectly benefit as the heat generation in the generator is reduced and cooling capacity of a cooling system of the wind turbine can thus be freed and redirected to cool the heat generating component.

As an example, the heat generating component may be an electrical component, in particular an electrical component downstream of the generator, such as an electrical component of the electrical drivetrain of the wind turbine, a cable, in particular a cable connecting the generator to a converter, a bus bar, an active power conditioning unit, a passive power conditioning unit, a converter, a transformer, a gear box or the like. The control may relate to two or more of such heat generating components, and the temperature of such two or more heat generating components may be obtained and evaluated to control the rotational speed of the generator as described above.

In an embodiment, the generator and the heat generating component are cooled by a cooling system. After increasing the rotational speed of the generator, the cooling system is controlled so as to redirect cooling capacity from the generator to the heat generating component. Even components of the wind turbine that do not directly benefit from the lower currents produced by the generator may thus be cooled more effectively by the present embodiment.

A further embodiment of the present invention relates to a wind turbine control unit for a wind turbine that comprises a rotor, a generator and at least one heat generating component. The control unit comprises an input configured to receive an indication of a temperature of the heat generating component, for example via a data bus that provides a connection to the heat generating component, or from a respective temperature sensor. The control unit further comprises an output configured to transmit a control signal to control the rotational speed of the generator, for example by providing a control signal to a system that controls the pitch of rotor blades of the rotor, and/or by providing a control signal to a controller that controls the power offtake from the generator. The control unit further comprises a processing unit configured to perform any of the above described methods. In particular, the control unit may obtain the temperature of the heat generating component via the input, determine the presence of a predetermined increase of the temperature of the heat generating component and, upon determining the presence of such predetermined temperature increase, control the rotational speed of the generator by providing a respective control signal on the output to increase the rotational speed of the generator while not increasing the electrical power output of the generator. The control unit can comprise a memory storing respective control instructions and a processor configured to execute the control instructions.

A further embodiment of the invention relates to a wind turbine that comprises a rotor, a generator coupled to the rotor, at least one heat generating component and a wind turbine control unit configured as described above. The heat generating component can be or include the generator. The wind turbine may further comprise a converter that is electrically connected to the generator and that is configured to convert electrical power produced by the generator. The rotor may comprise rotor blades the pitch angle of which can be controlled by the control unit. For controlling the generator speed, the control unit may provide the control signal to adjust the pitch angle or may control the power offtake from the generator, for example by providing a respective control signal to the converter to adjust the electrical load on the generator.

By such wind turbine control unit and such wind turbine, advantages similar to the ones outlined further above with respect to the embodiments of the method may be achieved. The wind turbine control unit and the wind turbine may be configured to perform any of the above described method steps and may have any of the above described configurations.

A further embodiment of the invention provides a computer program for controlling a wind turbine. The computer program comprises control instructions which, when executed by a data processor, cause the data processor to perform any of the above described methods. The computer program, in particular the control instructions, can be provided on a volatile or non-volatile data carrier or in a respective memory.

It is to be understood that the features mentioned above and those yet to be explained below can be used not only in the respective combinations indicated, but also in other combinations or in isolation, without leaving the scope of embodiments of the present invention.

BRIEF DESCRIPTION

Some of the embodiments will be described in detail, with reference to the following figures, wherein like designations denote like members, wherein.

DETAILED DESCRIPTION

In the following, embodiments of the invention will be described in detail with reference to the accompanying drawings. It is to be understood that the following description of the embodiments is given only for the purpose of illustration and is not to be taken in a limiting sense. It should be noted that the drawings are to be regarded as being schematic representations only, and elements in the drawings are not necessarily to scale with each other. Rather, the representation of the various elements is chosen such that their function and general purpose become apparent to a person skilled in the art.

Figure 1:
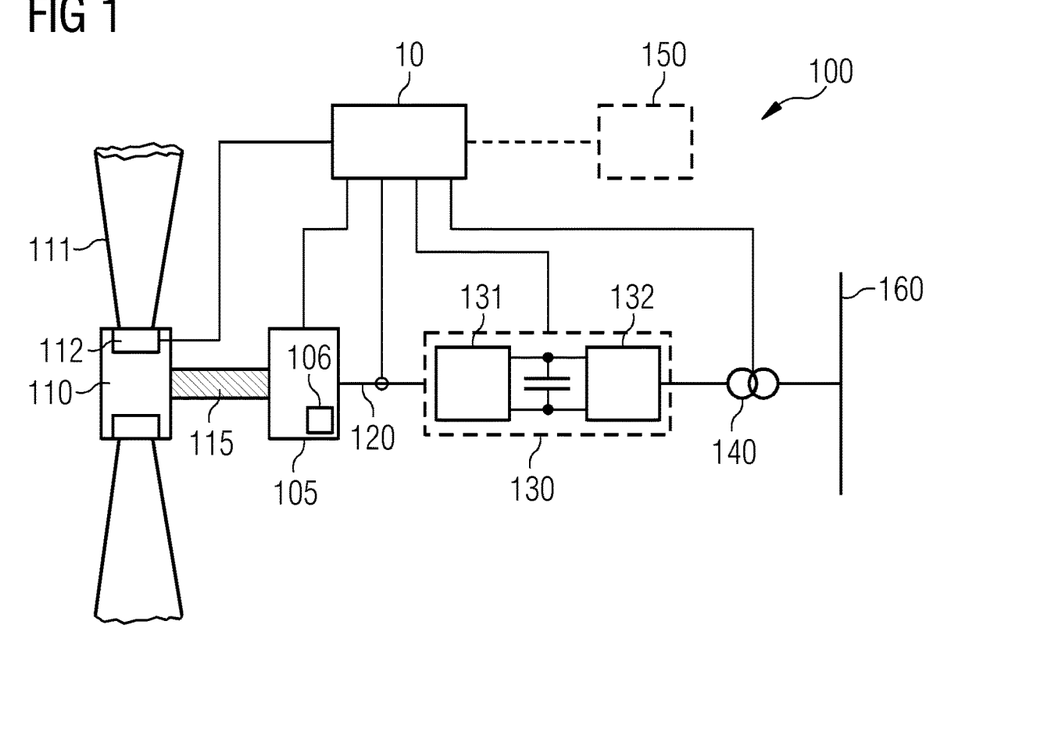
FIG. 1 is a schematic drawing showing a wind turbine and a wind turbine control unit according an embodiment of the invention.

FIG. 1 is a schematic drawing showing a wind turbine 100 according to an exemplary embodiment. The wind turbine 100 comprises a wind turbine control unit 10 that controls the operation of the wind turbine 100. The wind turbine 100 includes a rotor 110 that is coupled via a shaft 115 to a generator 105. The wind turbine 100 may be a direct drive wind turbine, in which the rotor 110 directly drives the generator 105, or a transmission or gearbox may be provided between the rotor 110 and the generator 105 that has a transmission ratio for operating the generator 105 at a higher rotational speed. The rotor 110 comprises two or more, preferably three, rotor blades 111. Each rotor blade 111 can be rotated around its longitudinal direction by means of a pitch control system 112. The pitch control system 112 can include an actuator, such as a servo motor or hydraulic cylinder, that rotates the rotor blade 111 around its longitudinal axis. The control unit 10 provides a control signal to the pitch control system 112 to control the orientation of the rotor blade 111. The blade orientation determines the amount of wind energy which is converted by the rotor blade to mechanical energy. A pitch angle of 0 degrees may correspond to a position in which the blade has the maximum aerodynamic efficiency (highest power point). When winds are higher than the rated speed, the rotor blades can be pitched out to reduce the amount of transferred energy and to operate the wind turbine at the optimal rotational speed of the rotor.

Generator 105 is configured to convert the mechanical energy provided by the rotor 110 into electrical energy. Rotor 110 applies a certain torque at a certain rotational speed, and generator 105 produces respective electrical power. The amount of current I flowing in the windings of the generator is generally proportional to the level of torque τ:

$$I = k^* \tau, \qquad (1)$$

wherein k is a proportionality ratio determined by properties of the electrical generator. The relationship between power P and τ is:

$$\tau = P/\omega, \quad (2)$$

wherein ω is the rotational speed of the generator.

As mentioned above, heat generation by a component is proportional to the square of the current flowing through the respective conductors. By reducing the generator torque, the level of current can accordingly be reduced. The inventors have recognized that the current levels can be reduced by increasing the rotational velocity of the generator to reduce the torque. In accordance with the above relationship, the torque can be lowered while the power output of the generator can be kept constant. Thereby, the current in the generator windings and thus the heating can be reduced significantly, while the power output of the generator can remain constant. The use of higher rotational speeds to decrease component temperatures is contrary to conventional solutions, where machines are generally considered to produce more heat when operated at higher speeds. In particular, conventional methods of reducing the heat production in wind turbines reduce the rotor speed to decrease the amount of heat production, as outlined in the background section of the present application.

Wind turbine 100 further comprises the converter 130 that converts electrical power generated by the generator 105, for example by performing AC to AC conversion. Converter 130 can include a generator side converter 131, in particular a rectifier, and a grid side converter 132, in particular an inverter. Converter 130 can adapt the frequency and/or phase of the generated electrical power to that of the power grid 160. Rectifier and inverter are coupled by a DC link.

A transformer 140 is furthermore provided for coupling the output of the converter 130 to the electrical power grid 160. The transformer 140 can step up the generated electrical power to the voltage required for transmission into the power grid 160. Transformer 140 can be part of the wind turbine 100 or can be a separate component.

Wind turbine 100 can furthermore comprise a cooling system 150, which can be an active cooling system employing for example a liquid or air as a cooling medium. Cooling system 150 can be configured to cool one or more components of the wind turbine 100, for example the generator 105, the converter 130, and/or the transformer 140. Control unit 10 of the wind turbine can be configured to control the cooling system 150, for example by controlling the amount of cooling provided to the one or more components of the wind turbine 100 that are cooled by the cooling system 150.

Wind turbine 100 can comprise electric cables and bus bars that connect respective electric components. For example, power cables 120 connect the generator 105 to the converter 130. Further corresponding electrical connections can be provided between the converter 130 and the transformer 140, and between the transformer 140 and the power grid 160.

The electrical drivetrain of the wind turbine 100 comprises the generator 105, power cabling, e.g. cable 120, the converter 130, the transformer 140, and may comprise further components, such as power conditioners for adjusting the amount of reactive power. Components of the electrical drivetrain produce heat that is at least partially proportional (in particular to the square) to the current in the system. Heat is for example generated by the current in the windings of the generator 105, by the currents in the power cable 120, any by currents in semiconductor switches of the converter 130. Generally, the generator 105 is the component of the electrical drivetrain that is most seriously affected by heat and can thus act as a limiting factor. The wind turbine 100 may comprise further heat generating components the heat generation in which is not directly proportional to the currents in the drivetrain.

Control unit 10 obtains information on the temperature of one or more heat generating components. For example, generator 105 can include a temperature sensor 106 which provides a signal indicative of the generator temperature to the control unit 10. Some components of wind turbine 100 may already comprise a temperature sensor or other temperature detection means or temperature detectors, and a sensor cable or a data communication bus may connect such component to the control unit 10, so that temperature information can be received by control unit 10 over such data connection. In other examples, a dedicated temperature sensor may be provided, for example for sensing the temperature of the power cable 120. Control unit 10 is thus capable of determining the temperature of one or more of the heat generating components, and in particular of the generator 105.

Control unit 10 is configured to determine the presence of a predetermined increase of the temperature of the respective heat generating component, as described hereinafter in more detail with respect to FIG. 2. If the control unit 10 determines the presence of a predetermined temperature increase, it controls the rotational speed of the generator so as to increase the rotational speed of the generator. As outlined above with respect to equation 2, this allows the torque to decrease while the electrical power output of the generator can be maintained. To increase the rotational speed of the generator 105, the control unit 10 can for example control the rotational speed of the rotor 110 by changing the pitch of the rotor blades 111. Controller 10 can for example adjust the pitch so that is oriented closer to the maximum aerodynamic efficiency and the rotor speed is increased or adjusted to a target speed. Controller 10 is furthermore configured to maintain the power output of the generator 105 constant, or to decrease the power offtake from the generator 105 while increasing its rotational speed.

The amount of power that is taken from the generator 105, e.g. the electrical load on the generator 105, can be adjusted by controlling the converter 130. For example, the switching cycles of the converter 130 can be controlled to determine the power offtake from the generator. The generator side converter 131 may be a PWM rectifier, the switching cycles of which can be controlled to determine the power offtake. In other examples, the grid side converter 132 can be a PWM inverter, the switching cycles of which can be controlled to determine the power offtake. It should be clear that other possibilities exist to control the amount of current, which is drawn from the generator 105, and that these may be used to control the power offtake from generator 105 by the control unit 10.

The converter 130 may for example comprise a converter controller, and the control unit 10 may provide to the converter controller a set point for the amount of power that the converter 130 takes off the generator 105, i.e. for the electrical load that the converter 130 applies to generator 105.

The control unit 10 may thus be configured to independently control the rotational speed of the rotor 110 (and thus of the generator 105) and the power offtake from generator 105. By increasing the rotational rate of the generator 105 while maintaining the power output from generator 105 constant, the heat production by generator 105 can be limited while the electrical power produced by the wind turbine 100 can remain constant.

In other embodiments, the control unit 10 may increase the electrical power output of the generator at a smaller proportion than the increase in rotational speed of the generator. As can be seen from equation (2), such smaller increase in the output power will still lead to a reduction of the generator torque, so that a reduction of the current level in the generator and thus in downstream electrical components can be achieved. Heat generation due to electrical losses in the generator and in such components, in particular components of the electrical drivetrain, can thereby be reduced. The percentage increase of power output can for example be less than 90%, 70%, 50%, or 25% of the percentage increase of the rotational speed of the generator.

Wind turbine 100 is not limited to any particular type of wind turbine. It may operate with different kinds of generators, such as a permanent magnet synchronous generator, an asynchronous generator, a doubly fed induction generator or the like. It is further not limited to a full converter solution as illustrated in FIG. 1 but may comprise a different system for conditioning the power output.

Figure 2:
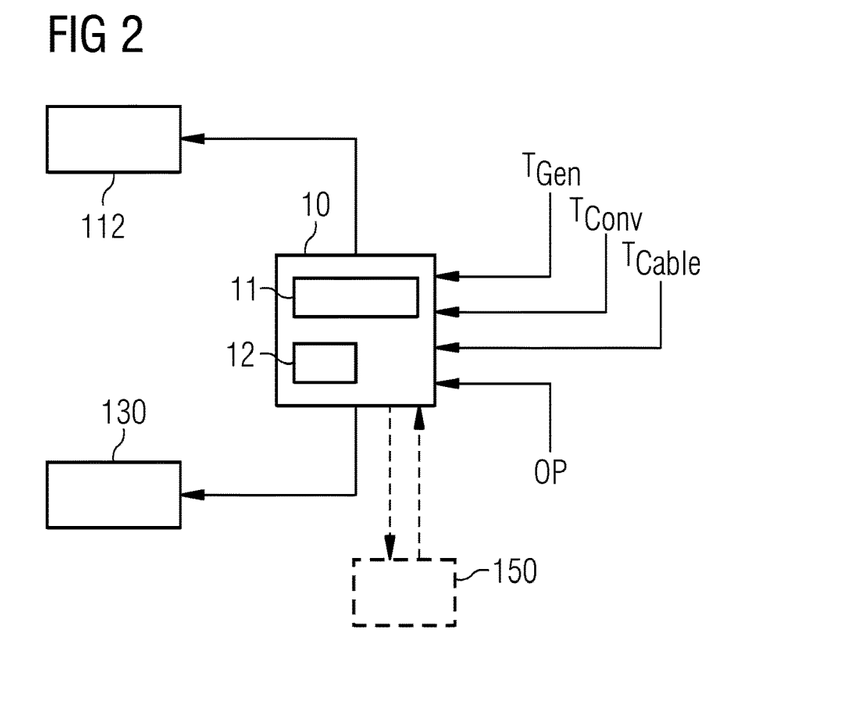
FIG. 2 is a schematic drawing illustrating a wind turbine control unit according to an embodiment of the invention.

FIG. 2 is a schematic drawing showing an embodiment of the wind turbine control unit 10, which may be employed in the wind turbine 100 of FIG. 1. The control unit 10 comprises a data processor 11, for example a microprocessor, a digital signal processor (DSP), an application specific integrated circuit (ASIC), or the like. It further comprises memory 12. Memory 12 can comprise volatile and non-volatile memory, such as RAM, ROM, flash memory, a hard disk drive or the like. Memory 12 stores control instructions that can be executed by the data processor 11. The control instructions and the control unit 10 can be configured to perform any of the methods described herein. Control unit 10 may comprise further components common to such control unit, such as an input/output interface for communicating with the components of the wind turbine described herein, for example for receiving data signals including information on the temperature of wind turbine components and for transmitting control signals to components of the wind turbine.

The controller 10 receives as inputs the component temperature $T_C$ of one or more wind turbine components. In the example of FIG. 2, the controller 10 receives the generator temperature $T_{Gen}$, the converter temperature $T_{Conv}$ and the cable temperature $T_{Cable}$. In other embodiments, further or fewer temperatures may be received, for example only the generator temperature. Control unit 10 may furthermore receive information on operating parameters OP of the wind turbine 100, such as information on the rotational speed of the rotor 110, information on the actual power output of the generator 105, information on the prevailing wind conditions and the like.

Based on the received information, the controller 10 controls the operation of the wind turbine 100. Control unit 10 for example provides a control signal to the pitch control system 112 to individually or collectively adjust the pitch of the rotor blades 111. Control unit 10 may for example transmit a set point for the rotor blade pitch or may directly control the actuator of the pitch control system 112. In the example of FIG. 2, the control unit 10 furthermore provides a control signal to the converter 130 to control the power offtake from generator 105. Control unit 10 may for example provide a target power offtake or a target current value to the converter 130, so that the converter 130 can adjust its operation based on such target value.

Control unit 10 may communicate with further components of the wind turbine 100, for example with the cooling system 150. It may receive information on the cooling capacity available from cooling system 150, and on the cooling provided to the different components of the wind turbine 100. Control unit 10 may provide a control signal to cooling system 150 to control the amount of cooling that is provided to the respective components of the wind turbine 100. For example, if the temperature of a component of the wind turbine that is not affected by a reduction in the current in the electrical drivetrain becomes too high, the control unit 10 can reduce the current in the generator by any of the methods described herein and can redirect cooling capacity from the generator to the respective component by controlling the cooling system 150. It should be clear that the cooling demand of other systems of the wind turbine may also be reduced, and controller 10 may redirect cooling capacity to components of the wind turbine 100 as required.

Figure 3:
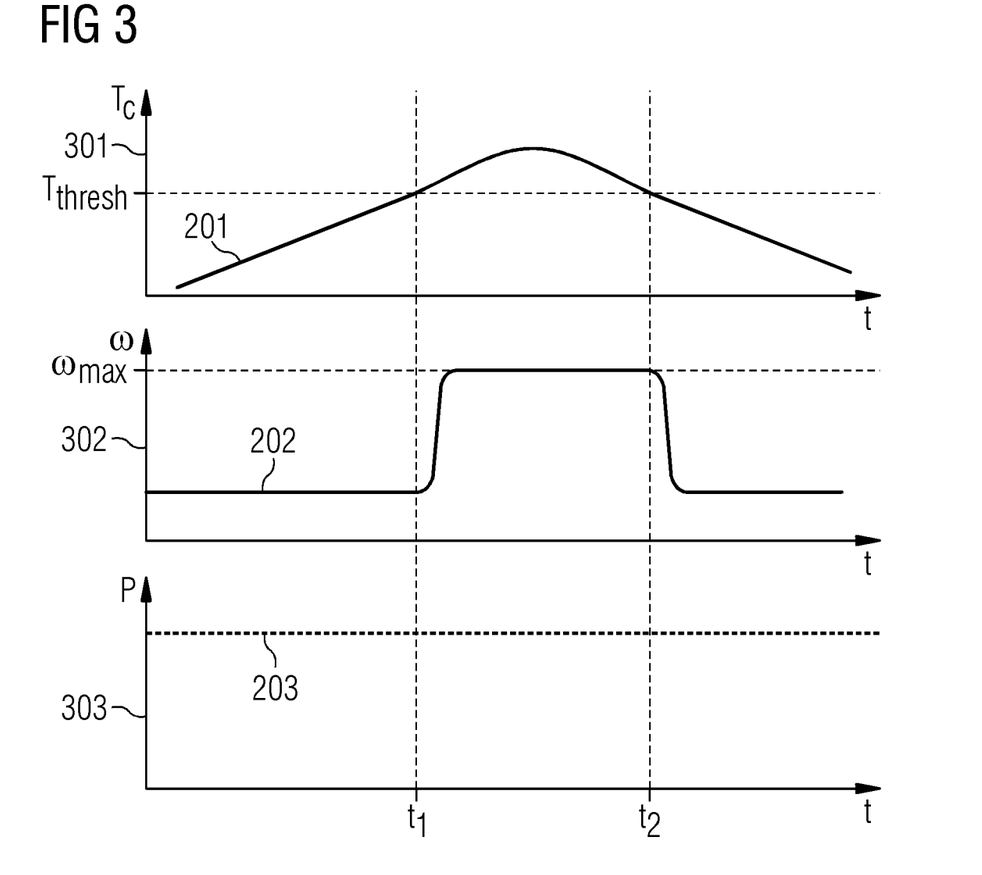
FIG. 3 is a schematic drawing showing exemplary diagrams of operational parameters when operating the wind turbine in accordance with an embodiment of the invention.
Figure 4:
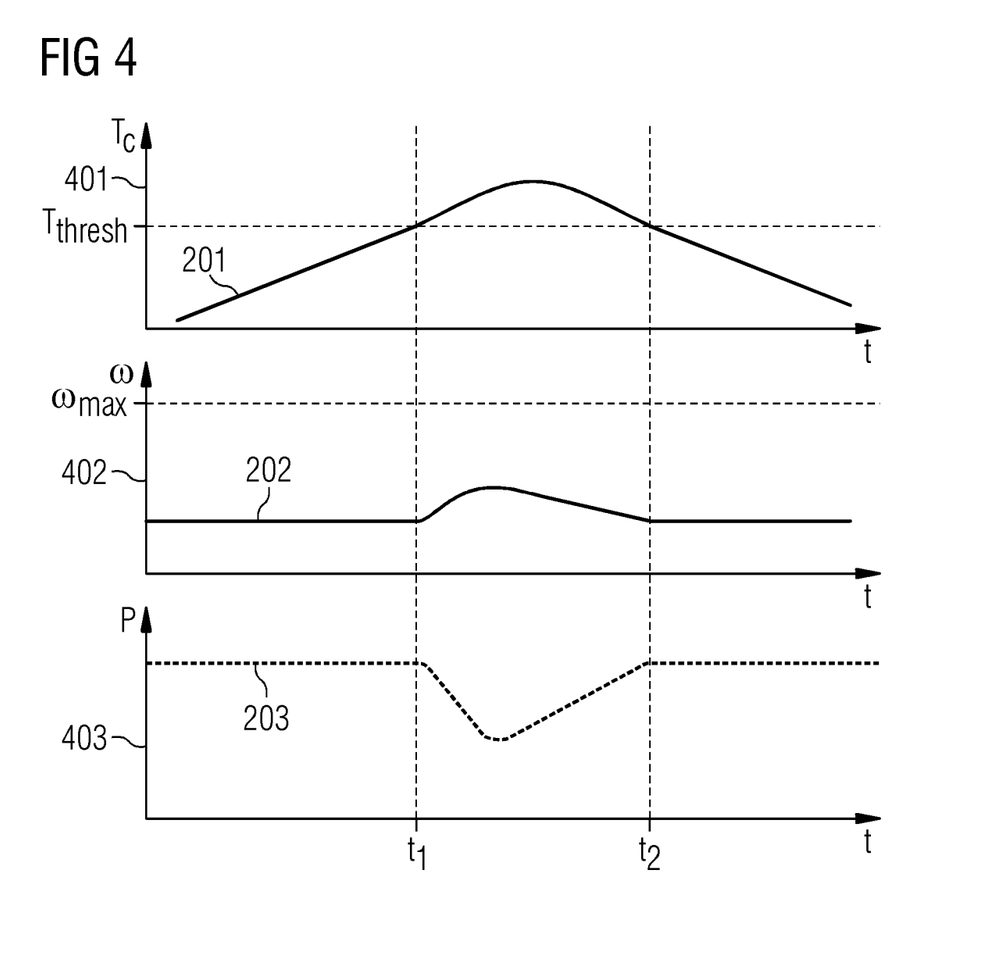
FIG. 4 is a schematic drawing showing exemplary diagrams of operational parameters when operating the wind turbine in accordance with an embodiment of the invention.
Figure 5:
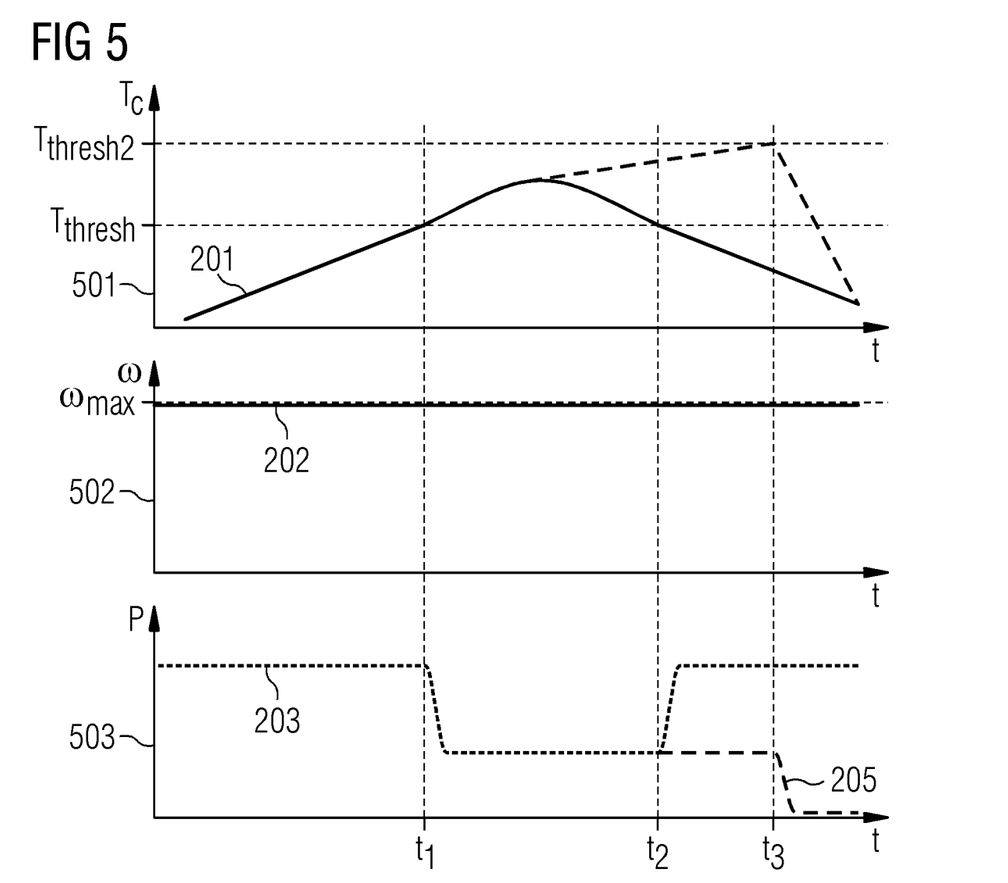
FIG. 5 is a schematic drawing showing exemplary diagrams of operational parameters when operating the wind turbine in accordance with an embodiment of the invention.

With respect to FIGS. 3-5, several ways of operating the control unit 10 and the wind turbine 100 are described.

FIG. 3 shows three schematic diagrams that illustrate operation of the control unit 10 in accordance with an embodiment of the method. Diagram 301 shows the component temperature $T_C$, which can for example be the temperature of the generator 105, as a function of time t. The diagram 302 shows the rotational speed ω of the rotor 110. The diagram 303 shows the output power P produced by the generator 105, i.e. the power offtake from generator 105.

As mentioned above, a rotor speed envelope can be defined for the wind turbine, the envelope establishing a maximum rotor speed that is permissible at every combination of wind speed and power output level. The maximum rotor speed is generally limited by the structure and mechanical loading constrains of the wind turbine. In FIG. 3, the maximum allowable rotational speed of rotor 110 is indicated at $\omega_{max}$, yet it should be clear that this value depends on the operating conditions of the wind turbine as defined by the respective rotor speed envelope.

It should be clear that the operating conditions shown in the diagrams are only for the purpose of illustration and will look differently in real operating conditions.

Controller 10 may operate with a temperature threshold $T_{thres}$, wherein the operating temperature of the heat generating component should maintained below the temperature threshold. $T_{thres}$ may for example be the lower boundary of a temperature range in which the component can still be operated, yet the operating time in this temperature range should be limited to increase the lifetime of the component. $T_{thresh}$ may thus be a soft limit, and the control unit 10 is operable to minimize the amount of time during which the component operates within this temperature range. For a generator 105, such temperature range may for example be between 125° C. and 145° C., or between 145° C. and 165° C., depending on the insulation class of the generator. The upper limit of such temperature range may constitute a second temperature threshold, above which damage to the component may be expected. If the component temperature exceeds such second hard threshold, the controller 10 may take further actions to reduce the heat generation by the respective component to avoid damage to the component, for example by significantly reducing the power offtake from the generator or by shutting off the wind turbine.

In other embodiments or operating modes, the temperature threshold $T_{thresh}$ may already be a hard temperature threshold above which the component should not be operated.

Curve 201 illustrates the component temperature. In the example of FIG. 3, the component temperature raises until it reaches the threshold temperature at time $t_1$. If the control unit detects that the component temperature has reached or exceed the temperature threshold, it controls the generator speed by increasing the rotational velocity of the rotor to increase the generator speed. As can be seen in diagram 302, the control unit 10 increases at $t_1$ the rotational speed of the rotor shown in curve 202 up to the maximum allowable rotational speed $\omega_{max}$. Control unit 10 in particular adjusts the collective pitch positions of the rotor blades such that the rotor reaches $\omega_{max}$. At the same time, the control unit 10 maintains the power offtake from the generator constant, in particular at the rated level (curve 203 in diagram 303). As explained in detail above, this will limit the generator torque, and the current levels in the generator are reduced as a result. This operating mode may be termed a torque limiting mode. As a result, the heat production in the wind turbine component is reduced.

Accordingly, the temperature increase in the heat generating component is reduced, and the component temperature again drops below the temperature threshold at time t2. Upon detecting that the component temperature has dropped below the temperature threshold, the control unit 10 reduces the rotational speed of the rotor to the nominal rotational speed for the prevailing conditions, in particular to the previous rotational speed. The wind turbine can then continue to operate with nominal operating parameters.

By providing such step change of the rotational speed of the rotor, the control and thus temperature limiting mode can be implemented relatively simple and straight forwardly. Besides such step change of the rotor speed, it is certainly possible to provide a more sophisticated control. For example, a control feedback loop may be provided that uses the difference between the component temperature 201 and the temperature threshold $T_{thresh}$ as an error signal and that minimizes such error signal by controlling the rotor speed by adjusting the pitch positions of the rotor blades. Such feedback control loop may give out a target speed for the rotor. In particular, proportional integral (PI) feedback may be employed. The rotational speed of the rotor may then only gradually increase and may not reach the maximum allowable rotational speed.

The control method described with respect to FIG. 3 may in particular be employed for situations where the rotor speed is below the maximum allowable rotor speed defined by the rotor speed envelope and can thus be further increased. Furthermore, it may be employed if the wind speeds are sufficient for rated power production, i.e. the rotor blades are not already pitched for maximum aerodynamic efficiency.

Further, besides employing a temperature threshold, the control method may also employ rate thresholds limiting the rate at which the component temperature raises. Accordingly, the rotor speed may be increased when the rate of temperature increase of the component reaches or exceeds a predefined temperature increased rate threshold. By considering the rate of temperature increase, counter measures against the temperature increase can be taken prior to reaching the temperature threshold $T_{thresh}$ by increasing the rotational speed of the rotor. When using a control feedback loop, a PID (proportional integral derivative) control loop may be employed.

It is noted that when increasing the rotational speed of the rotor at $t_1$, power output from the generator can also be increased at a proportion smaller than the increase in rotational speed. As can be seen from equation (2), a torque reduction and associated cooling effect is still achieved even when the power output of the generator is increased at such smaller proportion.

If the wind speeds are lower than required for producing the rated output power of the wind turbine, the control unit 10 may control the operation of the wind turbine as illustrated in the diagrams of FIG. 4. In such situation, the rotor blades are generally pitched at the optimum position for maximum aerodynamic efficiency. If the component temperature reaches the temperature threshold $T_{thresh}$, the control unit 10 maintains the optimum pitch of the rotor blades and does not decrease the rotational speed of the rotor. As shown in diagram 403, the control unit 10 gradually reduces the power offtake from the generator 105, whereupon the rotor speed increases as illustrated in curve 202, since the load on the generator is reduced. Again, a feedback loop, in particular, a PI controller, may control the reduction in the power offtake so as to achieve the target rotor speed determined by the PI controller and to limit the temperature increase of the wind turbine component. Due to aerodynamic effects, the increase in the rotor speed in this situation has a non-linear relationship with the reduction in power offtake. As a consequence, the overall reduction in torque will even be higher when employing this type of control compared to a method in which the power offtake is reduced, and the rotor speed is held constant or reduced by controlling the pitch of the rotor blades. In this exemplary control method, the heat generation in the wind turbine component is effectively limited, while the power output of the wind turbine is kept high even in these low wind conditions.

It should be clear that the variations of the control method as explained with respect to FIG. 3 are equally applicable to the method explained with respect to FIG. 4. For example, the power offtake as illustrated in curve 203 may not be reduced gradually and may not be reduced by making use of a feedback loop, but it may be reduced using a step function to simplify control.

FIG. 5 illustrates a situation in which the wind turbine is already operating with a maximum allowable rotor speed $\omega_{max}$, as illustrated in curve 202 of diagram 502, or where such maximum allowable rotor speed is reached during one of the above described control methods. In such situation, the rotational speed of the rotor 110 cannot be further increased, as this may cause damage to the rotor and the wind turbine. When the component temperature reaches the temperature threshold at $t_1$, the control unit 10 reduces the generator torque by reducing the power offtake from the generator 105, for example by controlling the converter 130 as described above (curve 203). Furthermore, the control unit 10 controls the rotor speed such that the rotor will continue to operate at the maximum allowable rotational speed as defined by the respective rotor speed envelope. In particular, the control unit 10 may adjust the pitch of the rotor blades so that the rotational speed is maintained at $\omega_{max}$. When the component temperature or the rate of temperature increase has lowered sufficiently, the control unit 10 will discontinue the power output curtailment.

This method may for example be combined with the method described with respect to FIG. 3. The increase of the rotor speed to $\omega_{max}$ alone may not be sufficient to bring down the temperature of the wind turbine component. If the component temperature remains above threshold for certain amount of time, or if the component temperature continues to rise, or if the component temperature reaches or exceeds a second temperature threshold, the control unit 10 can additionally reduce the power output of generator 105 to bring down the component temperature as shown in FIG. 5.

As described, the rotor speed can continue to operate at the maximum permitted and will only be reduced back to the nominal operating speed once the temperature or rate of temperature increase is sufficiently low so that the power output curtailment can discontinue. The rotor speed can be gradually reduced back to nominal or may be reduced in a step as shown in FIG. 3.

Again, the variations described with respect to FIG. 3 are equally applicable to the method described with respect to FIG. 5, and a simple step control of the output power may be performed, or the output power may be controlled by a feedback loop, in particular by a PI controller.

It should be clear that the control unit 10 may implement one, two or each of the control methods described above with respect to FIGS. 3 to 5, and may select the method to be employed in dependence on the prevailing conditions, such as component temperature, wind conditions, and rotational speed of the rotor.

In general, the wind turbine is not always operated at the maximum speed permit by the rotor speed envelope. Rather, rotor speeds can be kept lower during normal operations so as to reduce stress and fatigue on components, to reduce noise, and to reduce leading edge erosion of the wind turbine rotor blades. Accordingly, embodiments of the present invention employ higher rotor speeds temporarily for heat reduction. Through the higher rotor speeds, torque reduction is achieved, which is used as a control feature and actively applied on the basis of measurements of wind turbine component temperatures.

In particular, by embodiments of the invention, generator performance can be improved in conditions in which high ambient temperatures prevail, or in situations where faults in cooling systems exist. In particular, embodiments of the inventive method allow the output power of the wind turbine to be maintained relatively high even in such types of conditions. The increase in temperature of wind turbine components is contained while the wind turbine continues to produce electrical power at the maximum level possible for the prevailing conditions.

Figure 6:
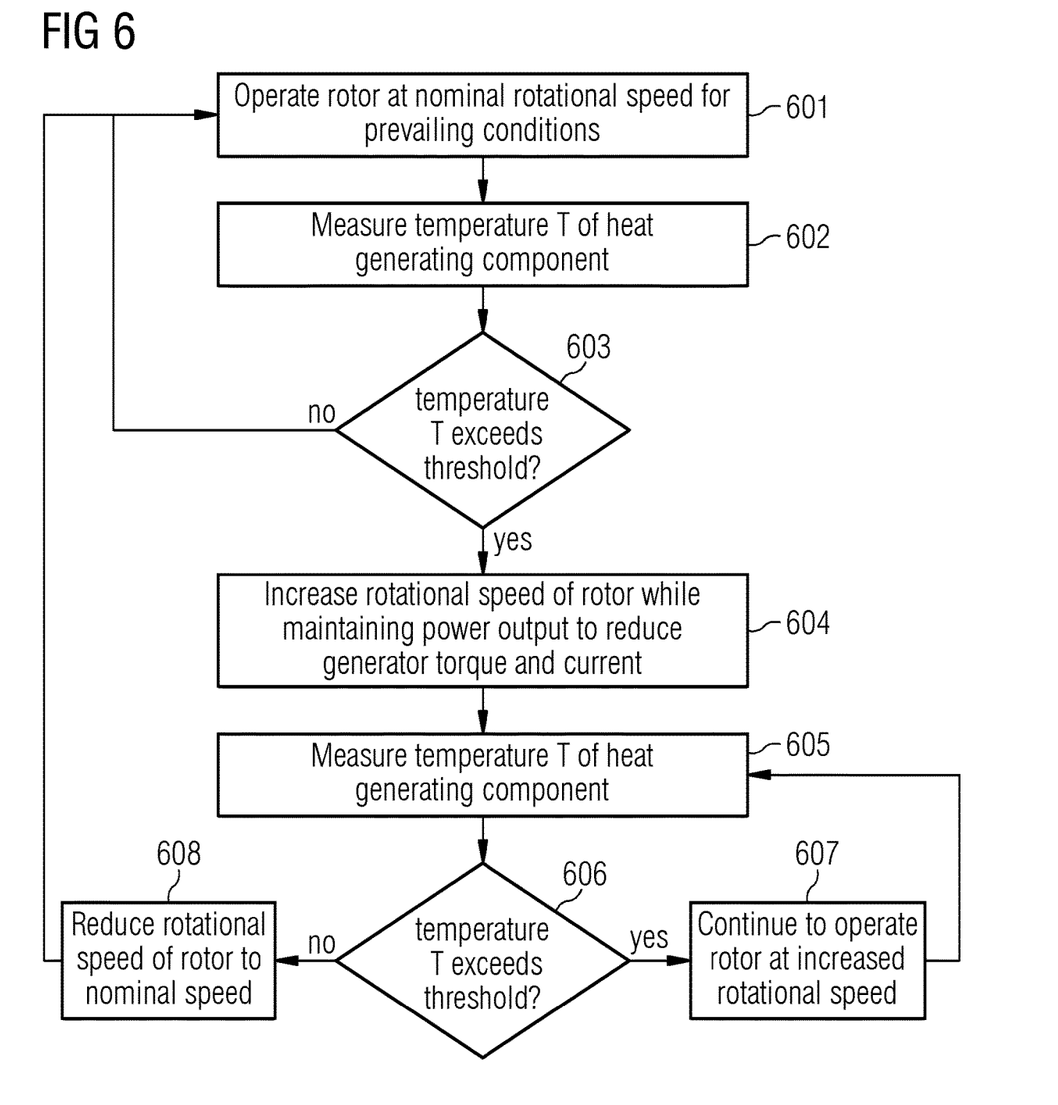
FIG. 6 is a schematic drawing showing a flow diagram that illustrates a method according to an embodiment of the invention.

FIG. 6 shows a flow diagram illustrating an embodiment of a method according to the invention. The method corresponds to the conditions illustrated in FIG. 3. At step 601, the rotor is operated at nominal rotational speed for the respective prevailing conditions, in particular wind speed and turbine characteristics. In step 602, the temperature of the heat generating component, for example of the generator, is measured. In decision step 603, it is determined whether the measured temperature T of the heat generating component exceeds a temperature threshold. As mentioned above, it may additionally or alternatively be determined whether a rate of temperature increase of the heat generating component exceeds a respective increase rate threshold. If the measured temperature does not exceed the threshold, the wind turbine continues to operate at nominal rotational speed. If the temperature threshold is exceeded, the rotational speed of the rotor is increased while the power output of the generator is not increased and is in particular maintained constant (step 604). Thereby, the generator torque and currents in the generator are reduced. In step 605, the temperature of the heat generating component is measured. In the decision step 605, the measured temperature of the component is again compared to the temperature threshold, which can be the same threshold as in step 603 or can be a different threshold (for example for reducing swinging effects). If it is determined in step 606 that the temperature of the component still exceeds the threshold, the rotational speed of the rotor is maintained at the increased level or is further increased (step 607). If the temperature increase cannot be stopped (dashed lines in FIG. 5) or the temperature of the component increases further above a second threshold ($T_{thresh2}$ in FIG. 5), output power curtailment may be employed (curve section 205 in FIG. 5) or the wind turbine may be shut down to avoid any damage to the respective component, in particular to the generator.

If it is determined that the component temperature no longer exceeds the threshold, the rotational speed of the rotor is again reduced back to the nominal rotational speed (step 608). Operation of the wind turbine continues with nominal rotational speed of the rotor for the respective prevailing conditions (step 601).

Adjusting the rotational speed of the rotor may again be performed by a feedback controller that for example implements the loop illustrated in FIG. 6 and that gradually increases the rotational speed of the rotor, or the rotor speed may simply be set to a higher rotor speed, such as the maximum allowable rotational speed.

It should be clear that the method may furthermore comprise any of the steps described hereinabove and in particular with respect to FIGS. 3 to 5. Furthermore, it should be clear that the control unit 10 can be configured to carry out any of the methods described herein.

Figure 7:
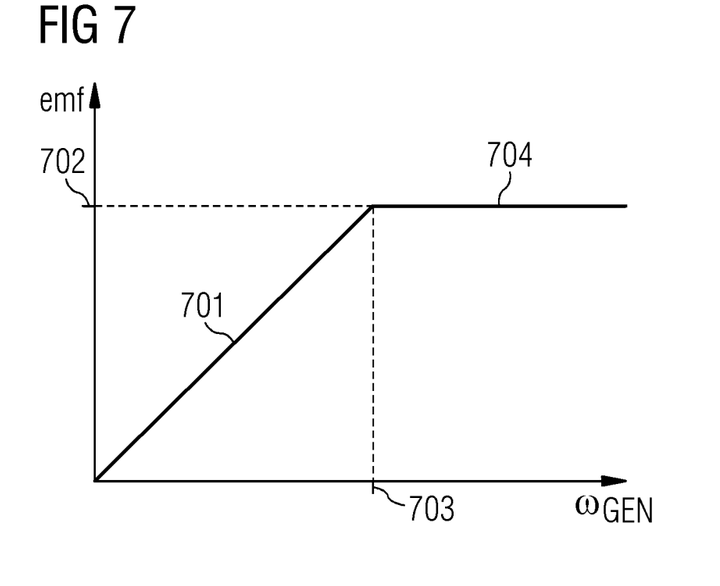
FIG. 7 is a schematic drawing showing a diagram of a generator induced electromotive force (emf).

The schematic diagram of FIG. 7 illustrates an example of how the power offtake from the generator 105 can be controlled. In general, the power produced by a generator can be described by the equation $P \sim I V \cos \phi$, wherein P is the active power (watts), I is the current (amperes), V is the voltage (volts), and $\cos(\phi)$ is the power factor.

When the generator is rotating, the voltage produced by the generator (also called back electromotive force or back emf) typically increases linearly. According to the above equation for the generated power, as the voltage increases, the power taken off the generator can be kept constant by drawing less current. It is thus possible to achieve the same power at the same power factor. The increase of back emf with generator rotational speed $\omega_{GEN}$ is shown at reference numeral 701 in FIG. 7.

The electrical system of the wind turbine, in particular of the respective section of the drivetrain, may have a voltage limit, which should not be exceeded to avoid damage to the respective components or a reduction in lifetime. FIG. 7 illustrates the respective voltage limit 702, which is reached at the rotational speed limit indicated with reference numeral 703. If the rotational speed continues to increase beyond this limit 703, then the control unit 10 may control the converter 130 such that the voltage remains the same, but the power factor is increased closer to 1 (lagging). This is shown at curve section 704 of the diagram of FIG. 7. As can be seen from the above equation, by increasing the power factor and maintaining the power and voltage constant, the current drawn from the generator can be reduced. Accordingly, a reduced heat generation in the generator and in downstream electrical components can be achieved, and/or the cooling capacity that is freed by reducing the heat generation can be redirected.

The adjustment of the power factor may be performed by the control unit 10 by controlling a power converter that is configured to allow an adjustment of the balance between active and reactive current at the generator. Additionally, or alternatively, the reactive power may be controlled by providing one or more capacitor banks which can be switched into the circuit under control of the control unit 10. It thus becomes possible to supply reactive power to the network.

Other possibilities for controlling the power output and power factor of the generator exist. For example, the magnitude of a rotor field current of a synchronous generator may be controlled for adjusting the generated reactive power.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method of controlling the operation of a wind turbine comprising a rotor, a generator and at least one heat generating component, wherein the method comprises:
    obtaining a temperature of the heat generating component;
    wherein the heat generating component is at least one of the generator, a component which generates heat due to electrical losses associated with a production of electrical power, and a component cooled by a cooling system that provides cooling to the generator;
    determining the presence of a predetermined increase of the temperature of the heat generating component; and
    upon determining the presence of the predetermined temperature increase, controlling the rotational speed of the generator so as to increase the rotational speed of the generator while not increasing the electrical power output of the generator or while increasing the electrical power output of the generator at a smaller proportion than the increase in rotational speed of the generator so as to reduce the level of electrical current in the generator;
    wherein increasing the rotational speed of the generator comprises reducing a power offtake from the generator, wherein a pitch of rotor blades of the rotor is maintained or is adjusted so as to increase the aerodynamic efficiency of the rotor blades while the power offtake from the generator is reduced.

2. The method according to claim 1, wherein controlling the rotational speed of the generator comprises controlling the rotational speed of the rotor.

3. The method according to claim 1, wherein the rotational speed of the generator is increased by increasing the rotational speed of the rotor by adjusting a pitch of rotor blades of the rotor.

4. The method according to claim 1, wherein controlling the rotational speed of the generator comprises controlling the power offtake from the generator.

5. The method according to claim 1, wherein controlling the rotational speed of the generator so as to increase the rotational speed of the generator comprises setting the rotational speed of the rotor to a maximum allowable rotational speed, or gradually increasing the rotational speed of the rotor.

6. The method according to claim 1, wherein the rotational speed of the rotor is controlled by a feedback loop based on at least one of the temperature and rate of temperature increase of the heat generating component.

7. The method according to claim 1, wherein determining the presence of a predetermined increase of the temperature of the heat generating component comprises comparing the temperature of the heat generating component to a temperature threshold and determining that the temperature is equal to or larger than the temperature threshold, and/or wherein determining the presence of a predetermined increase of the temperature of the heat generating component comprises comparing a rate at which the temperature of the heat generating component increases to an increase rate threshold and determining that the rate of temperature increase is equal to or larger than the increase rate threshold.

8. The method according to claim 1, wherein, if the rotor rotates at a maximum allowable rotational speed or reaches the maximum allowable rotational speed, and the temperature of the heat generating component or a rate of temperature increase of the heat generating component reaches or exceeds a respective predetermined threshold, the method further comprises reducing the power offtake from the generator.

9. The method according to claim 8, wherein the rotor continues to operate at the maximum allowable rotational speed by adjusting the pitch of the rotor blades.

10. The method according to claim 1, wherein not increasing the power output of the generator comprises controlling the generator or an electrical converter coupled to the generator such that the power offtake from the generator is not increased.

11. A wind turbine control unit for a wind turbine comprising a rotor, a generator and at least one heat generating component, wherein the control unit comprises:
    an input configured to receive an indication of a temperature of the heat generating component;
    an output configured to transmit a control signal to control the rotational speed of the generator; and
    a processing unit configured to perform the method of claim 1.

12. A wind turbine comprising:
    a rotor;
    a generator coupled to the rotor;
    at least one heat generating component; and
    a wind turbine control unit according to claim 11.

13. A computer program for controlling a wind turbine, wherein the computer program comprises control instructions which, when executed by a data processor, cause the data processor to perform the method of claim 1.

* * * * *